(12) United States Patent
Judd

(10) Patent No.: US 6,751,634 B1
(45) Date of Patent: Jun. 15, 2004

(54) METHOD AND SYSTEM FOR DETECTING OBJECT INCONSISTENCY IN A LOOSELY CONSISTENT REPLICATED DIRECTORY SERVICE

(75) Inventor: Steven G. Judd, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/383,445

(22) Filed: Aug. 26, 1999

(51) Int. Cl.$^7$ .............................................. G06F 12/00
(52) U.S. Cl. ...................................... 707/200; 707/100
(58) Field of Search ............................... 707/1, 2, 100, 707/103, 200, 201, 203, 103 R–103 Z

(56) References Cited

U.S. PATENT DOCUMENTS

| | | | | |
|---|---|---|---|---|
| 4,794,528 A | * | 12/1988 | Hirose et al. | 707/101 |
| 5,313,633 A | * | 5/1994 | Tomita et al. | 395/700 |
| 5,355,473 A | * | 10/1994 | Au | 395/600 |
| 5,467,471 A | * | 11/1995 | Bader | 395/600 |
| 5,530,957 A | * | 6/1996 | Koenig | 395/600 |
| 5,588,147 A | | 12/1996 | Neeman et al. | 395/601 |
| 5,765,152 A | * | 6/1998 | Erickson | 707/9 |
| 5,787,247 A | | 7/1998 | Norin et al. | 395/200.5 |
| 5,794,253 A | | 8/1998 | Norin et al. | 707/203 |
| 5,852,820 A | * | 12/1998 | Burrows | 707/2 |
| 5,857,182 A | * | 1/1999 | DeMichael et al. | 707/3 |
| 5,951,649 A | * | 9/1999 | Dobbins et al. | 709/238 |
| 6,070,171 A | * | 5/2000 | Snyder et al. | 707/203 |
| 6,158,044 A | * | 12/2000 | Tibbetts | 717/1 |
| 6,195,796 B1 | * | 2/2001 | Porter | 717/11 |
| 6,212,526 B1 | * | 4/2001 | Chaudhuri et al. | 707/102 |
| 6,260,042 B1 | * | 7/2001 | Corbera et al. | 707/101 |
| 6,317,142 B1 | * | 11/2001 | Decoste et al. | 345/594 |

OTHER PUBLICATIONS

Mindshare, Inc. *Fire Wire System Architecture: IEEE 1394a.* 2nd edition, Chapter 2, pp. 19–34. (1999).

Judd, Steve. *Consistency and the Active Directory: Dealing with Replication Latency in Your Services and Applications.* (1998), pp. 1–12.

Leach et al. *UUIDs and GUIDs*—draft. [web page] Feb. 4, 1998. http://search.ietf.org/internet–drafts/draft–leach–uuids–guids–01.txt. [Accessed Jun. 9, 1999], pp 1–24.

(List continued on next page.)

*Primary Examiner*—Greta Robinson
*Assistant Examiner*—Harold E. Dodds, Jr.
(74) *Attorney, Agent, or Firm*—Leydig, Voit & Mayer, Ltd

(57) ABSTRACT

The invention describes a system for detecting partial changes to data-structures of interest. If an inter-related set of data items are to be used then it is of value to know that the data items are undergoing changes, and thus may not be self consistent, and/or have been tampered with and/or are not the most recent update. The invention uses GUIDS to track updates by assigning a GUID to a selected set of nodes or items belonging to an identified set, preferably arranged in a tree structure. A new GUID is generated whenever an update takes place. Methods are defined to test that the interrelated data items are valid, i.e., replicated in toto, by testing for changes in the GUID by traversing the interrelated data items and comparing GUIDs at each node. Similarly, methods are provided for generating a new GUID in course of inititiating an update, or in order to invalidate an intererlated data item set, and additional methods are envisaged for catering to particular applications such as assuring integrity of the data by using encryption and certificates.

24 Claims, 8 Drawing Sheets

OTHER PUBLICATIONS

Microsoft Corporation. *Microsoft Windows 2000 Active Directory Technical Summary.* [web page] Aug. 1998. http://msdn.microsoft.com/library/backgrnd/html/msdn_actdsum.htm. [Accessed Feb. 9, 2000], pp 1–23.

Casey, Thomas. *Architectural Overview of Replication.* [web page] Sep. 1997. http://msdn.microsoft.com/library/techart/sqlrepl.htm. [Accessed Feb. 9, 2000]; pp 1–7.

Microsoft Corporation. *Microsoft SNA Server: Host Data Replication.* [web page] 1998. http://www.microsoft.com/SNA/Guide/datarep.asp. [Accessed Jun. 18, 1999], pp. 1–2.

Microsoft Corporation. *Microsoft Windows NT Server: Case Study:* www.msnbc.com. [web page] 1998. http://www.microsoft.com/NTServer/nts/exec/casestudy/casestudy/msnbc.asp. [Accessed Jun. 18, 1999], pp. 1–3.

Microsoft Corporation. *Microsoft Office Developer Web Forum: Using Database Replication.* Chapter 19 [web page] Jun. 24, 1996. http://www.microsoft.com/ACCESSEDEV/Articles/BuildApp/BAPP29.HTM. [Accessed Jun. 18, 1999], pp 1–13.

Microsoft Corporation. *Microsoft Developer's Network CD: Microsoft Windows NT Active Directory.* Jul. 1999, pp 1–22.

Microsoft Corporation. *Microsoft Developer's Network CD: Microsoft Windows 2000 Active Directory Technical Summary.* Jul. 1999, pp 1–23.

Microsoft Corporation. *Microsoft Developer's Network CD: Microsoft Exhange Server Directory Integraton with the Microsoft Windows 2000 Active Directory,* Jul. 1999, pp. 1–17.

* cited by examiner

METHOD AND SYSTEM FOR DETECTING OBJECT INCONSISTENCY IN A LOOSELY CONSISTENT REPLICATED DIRECTORY SERVICE

TECHNICAL FIELD

This invention relates generally to replication between networked servers or computers and, more particularly, relates to a method to detect partially replicated objects in a database in order to ensure that such objects are used in a consistent state in distributed database implementations.

BACKGROUND OF THE INVENTION

Use of distributed computer networks to implement databases results in more responsive databases, including local updating and management in multiple master systems. Redundancy built into a distributed implementation results in a more resilient and reliable database. A database may be thought of as constituting two essential properties, viz., a collection of data objects and a set of procedures/tools/methods for locating a particular one of the data objects. The procedures/tools/methods for locating a particular data item are included in a directory or directory service. There may be more than one directory in a database, and possibly a directory service for assistance in locating the proper directory. The directory service is a namespace that aids in resolution of an identifier to a corresponding object, or even attribute, using appropriate mappings that include simple directory tables. Commercial databases typically include storage for the objects and implementations of directory services for navigating the directories describing the organization of the stored data in the database.

Databases are central to meaningful transactions on a computer regardless of whether a computer is networked or not. A file stored in an ordinary personal computer hard drive is, ultimately, an entry in a database accessed through a file access table having file names and a plurality of memory locations. Moreover, changes to this file may be incremental in that the entire file is not rewritten immediately, but instead, a record is made of the desired changes. If two different entities try to access and modify a typical file, traditionally only one is permitted with the other one being locked out. This is a safety feature designed to avoid inconsistent changes that may interfere with the operation of software. Commercial databases are designed for different contexts but often have similar concerns during their use by client applications.

In order to minimize the risk of service disruption and facilitate faster access, commercial databases are preferably maintained on several networked computers, playing the role of servers, which update each other's versions. These updating operations between computers are termed replications. If a particular computer crashes, another computer takes-over. Users of the database may actually be only aware of a database-implementing network as a single entity rather than the individual components that make up the network.

A replication operation may result in the copying the entire state of a database to another database. However, this is often impractical and usually an incremental replication scheme (IRS) is implemented instead. In an IRS, changes since the last replication step, or portions thereof, are replicated to the other machine.

Generally, there are two commonly used strategies for carrying out an IRS, and there are numerous variations within each strategy. The first strategy utilizes the single-master server (SMS) model in which one of the computers is designated as the primary server (PS). One or more backup servers (BS) replicate from the PS. Changes are first made to the PS and are then propagated to the backup servers via replication. During replication between PS and BS, often a lock is placed on both to ensure that the data does not change while replication is taking place. Furthermore, the replicating components are usually unavailable for the duration of the lock. The reasons for placing a lock include the desire to avoid identifying two machines as being synchronized when one or both may change during the process for synchronization itself, with the possibility of the next incremental replication operation treating non-replicated data as already having been replicated.

The second strategy for IRS is based on networking multiple-master servers (MMS). In a multiple-master system, many servers replicate from each other, and changes may be independently made to their respective databases. This permits updates to be made locally with local management while the changes eventually are reflected in the entire network. Thus, in the MMS system there is no need for a primary server. Furthermore, a server may even restrict itself to a defined subset of the data while routing requests requiring additional data to other servers in the network.

A difficulty presented by MMS units is that changes to the database can occur, in any order, on any of the MMSs in a network. Furthermore, because many older networks utilize the single-master server model many hybrid networks may exist where the multiple master servers replicate to other multiple master servers while one of the multiple master servers emulates a primary server for the benefit of single master servers in the network. Further details about managing replication in a hybrid network are provided in the U.S. patent application Ser. No. 09/360,498, "METHOD AND SYSTEM FOR REPLICATION IN A HYBRID NETWORK," filed on Jul. 26, 1999.

Many implementations of MMS networks are based on the multi-master loose consistency with convergence model in which a change to a replica propagates to other replicas but without any guarantees that at any given time the replicas will be consistent with each other. If no new changes are made then the system is guaranteed to converge on the same set of values. This model is attractive because it is compatible with highly distributed database implementations capable of growing to include millions of objects and thousands of replicas. In addition, the model also allows for inclusion of nodes with intermittent connectivity in the network.

Accessing inconsistent data can be a handicap for many applications. Inconsistent data among various replicas in multi-master loose consistency with convergence model is due to propagation time needed by the updates to reach the entire network. There is no known strategy for predicting the future state of a system based on such a model or even predicting when changes would be applied in the system resulting in a "nondeterministic latency," which is a fact of life for applications operating in such an environment.

From the perspective of applications, which are the usual clients for database services, in a multi-master loose consistency with convergence model, there are three states that may be encountered. First is the possibility that none of the changes to a source have propagated to a destination replica resulting in a "version skew." Applications have to expect such a possibility of having consistent but stale data. Second, only some of the changes applied to a source may have propagated to a destination replica resulting in a "partial-update." An application retrieving data from the replication replica would benefit from knowing that it is a partial-update, specially, if consistency between data objects is important. Third, all of the changes applied at a source may have propagated to a destination replica resulting in a "fully replicated" state.

Directory-enabled applications use directory services to store configuration information, operational instructions or other information. It is possible that multiple copies of the application may be executing on the network at the same time, and as a consequence, reading/writing to replicas of the directory service. It is possible that some directory-enabled applications may use more than one replica. Some of these applications may handle version skew should an inconsistency be detected between replicas, provided partial-updates can be ruled out.

An exemplary application, sensitive to consistency concerns, is a remote access service using the directory to store policy and profile information. The policy information is stored in one set of objects, and the profile in another object-set. When a user connects to the remote access service, the remote access service reads the policy to determine whether the user has access, and if so what profile to apply to the user's session. Partial-update can affect the remote access service in several ways. If the policy is complex and consists of multiple objects, the remote access service might read a partially updated policy resulting in incorrect denial or granting of service to the user, inability to process the policy due to internal inconsistency, etc. If the both policy and profiles have been updated, the service might correctly process the policy but apply a stale profile, because the policy objects have replicated but the profile objects have not. If the profile is complex and consists of multiple objects, the service might correctly process the policy but apply a partially updated profile because the policy objects have replicated but only some of the profile objects have done so.

In addition, detection of unauthorized partial-updates is important in many contexts. If making unauthorized changes results in a partial-update, the detection of the partial-update would provide protection to applications requiring secure data.

SUMMARY OF THE INVENTION

In view of the foregoing, in accordance with this invention, a method and system are provided for detecting partially updated data object-sets. Data objects required to be consistent with each other are organized as a contiguous sub-tree in a database to form an object-set. The root node of this sub-tree stores a consistency-identifier, preferably a globally unique identifier (GUID), which is generated anew each time the object-set is changed to another updated consistent object-set. The root node also stores the value of a function of the count of children of the root node. A user accessing data in this sub-tree has available methods for creating an object-set, validating an object-set and invalidating an object-set by checking if the number of children with the same consistency-identifier matches the number of children recorded in the root node. Other functions may be constructed to provide combinations or extensions of similar functions.

An operation for reading data invokes the object-set validating method, which indicates if the object-set sub-tree is partially updated. An operation for writing, i.e., changing the object-set, invokes the object-set invalidating method so that subsequent attempts to read from the object-set reveal that an update is being made. The write operation terminates after invoking the create_object_set method to make the object-set valid.

This strategy is also compatible with and useful in detecting unauthorized access or modifications to an object-set by adding digital signatures, (and, optionally, encryption) to the entries and providing a user interface between a client and the server to facilitate authentication by standard protocols. In some versions, modifications by an unauthorized source could result in the object set being marked as a partial update for an extraordinary length of time.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
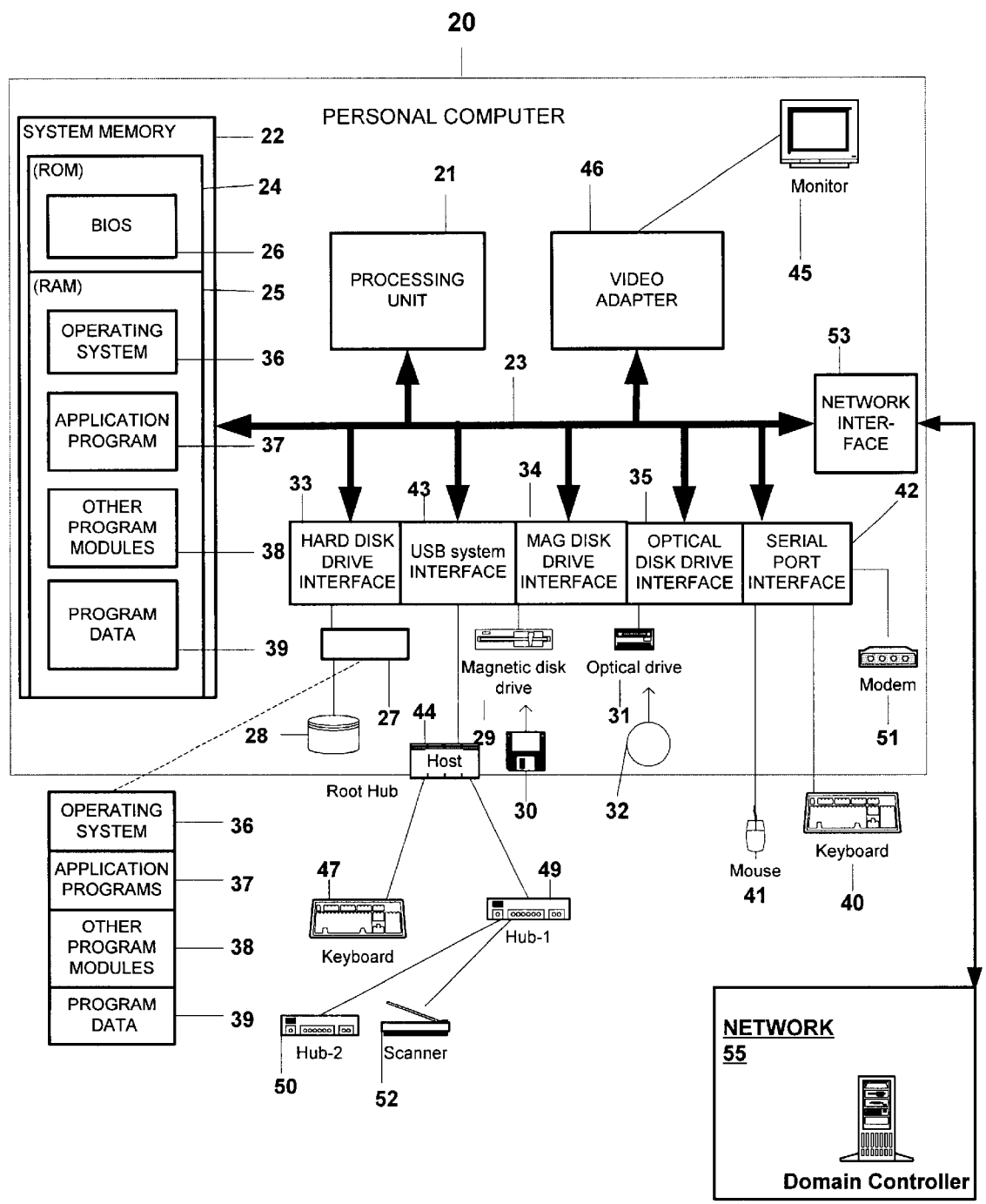
FIG. 1 is a block diagram generally illustrating an exemplary computer system on which the present invention is implemented in part.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 may further include a hard disk drive 27 for reading from and writing to a hard disk 28, a magnetic disk drive 29 for reading from or writing to a removable magnetic disk 30, and an optical disk drive 31 for reading from or writing to a removable optical disk 32 such as a CD ROM or other optical media.

The hard disk drive 27, magnetic disk drive 29, and optical disk drive 31 are connected to the system bus 23 by a hard disk drive interface 33, a magnetic disk drive interface 34, and an optical disk drive interface 35, respectively. The drives and their associated computer-readable media provide nonvolatile storage of computer readable instructions, data structures, program modules and other data for the personal computer 20. Although the exemplary environment described herein employs a hard disk 28, a removable magnetic disk 30, and a removable optical disk 32, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 28, magnetic disk 30, optical disk 32, ROM 24 or RAM 25, including an operating system 36, one or more applications programs 37, other program modules 38, and program data 39. A user may enter commands and information into the personal computer 20 through input devices such as a keyboard 40 and a pointing device 41. Other input devices (not shown) may include a microphone, joystick, game pad, satellite dish, scanner, or the like. These and other input devices are often connected to the processing unit 21 through a serial port interface 42 that is coupled to the system bus. Increasingly, such devices are being connected by the next generation of interfaces, such as a universal serial bus (USB) 43 with a root hub/Host 44, and to which other hubs and devices may be connected. Illustrated are keyboard 47, and a hub-1 49 connected to the root hub/Host 44. Hub-1 49 is further connected to a hub-2, 50, and scanner 51.

Other interfaces that may be used include parallel ports, game ports, and the FireWire, i.e., the IEEE 1394 specification available at www.standards.ieee.org/catalog/bus.html#1394-1995. A monitor 45 or other type of display device is also connected to the system bus 23 via an interface, such as a video adapter 46. In addition to the monitor, personal computers typically include other peripheral output devices. A network interface 53 allows the computer 20 to communicate with a network 55, which includes a plurality of domain controllers. The components within network 55 may use high bandwidth connections and switches as well as large memory storage devices to service users, such as computer 20, accessing the network 55.

The server/personal computer 20 may operate in a networked environment using logical connections to one or more remote computers/servers. The remote computer may be another personal computer, a server, a router, a network PC, a peer device or other common network node, and typically includes many or all of the elements described above relative to the personal computer 20 in FIG. 1. Such networking environments are commonplace in offices, enterprise-wide computer networks, intranets and the Internet.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Much of the following discussion will use the context of updating and maintaining databases although the described methods are also useful in distributed computing in general. Although the implementation discussed below is in the context of database organized in domains managed via domain controllers (DC), it also applies to computer/server 20, and in managing information within network 55 based applications in general. A domain, in the context of a domain server, refers to a defined, interrelated portion of a database sharing a common security boundary. In the context of databases, a domain is also used to denote a range of values acceptable for an attribute, e.g. a day of the month cannot exceed 31 and has to be a positive integer.

Figure 2:
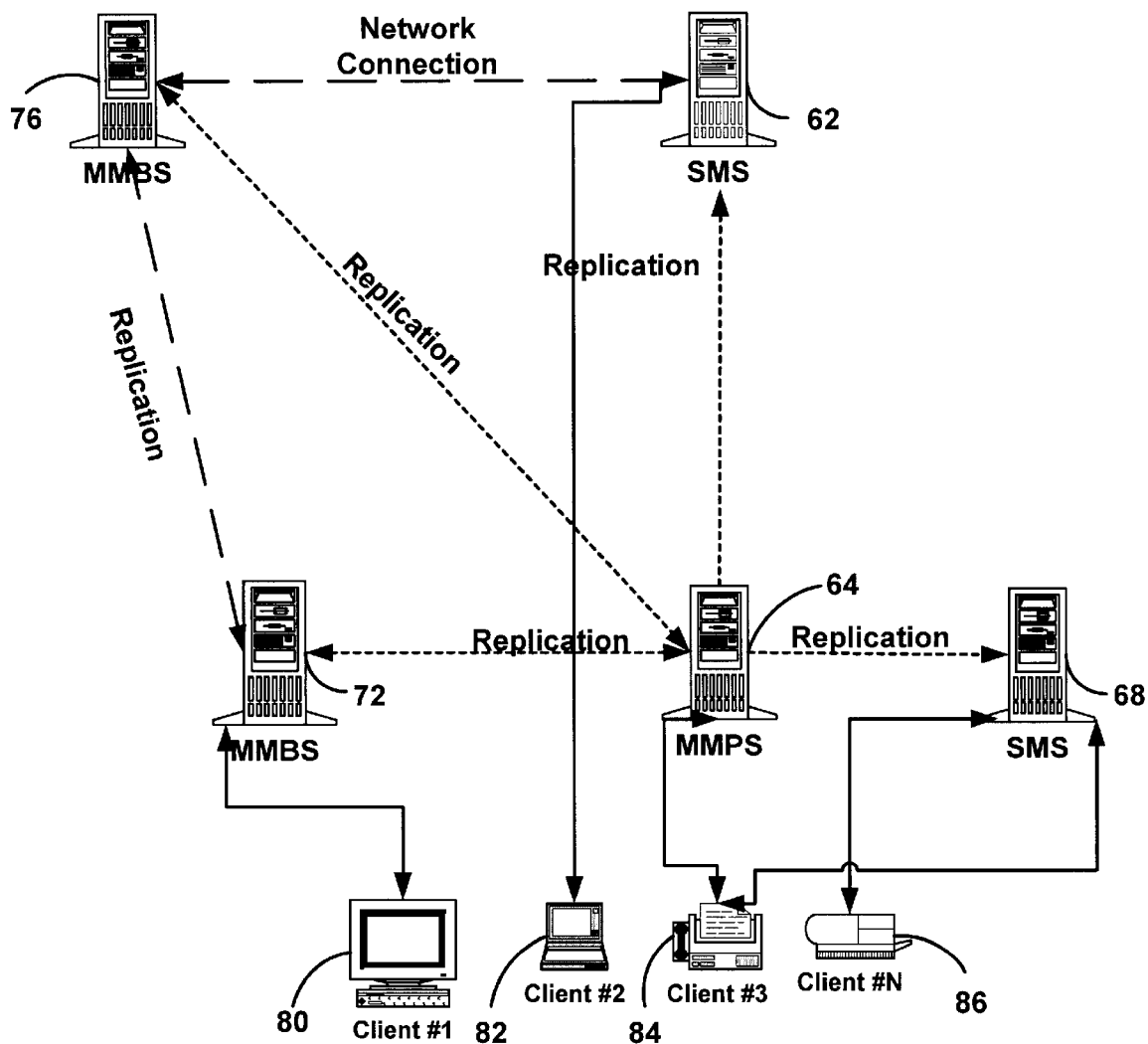
FIG. 2 is a block diagram illustrating a network comprising multiple-master servers (MMS) and single-master servers (SMS)

FIG. 2 illustrates an exemplary environment in which an embodiment of the invention operates, although other distributed implementations are possible. This environment includes a hybrid network with a single-master server (SMS) 62, which can communicate with a multiple-master primary server (MMPS) 64. Another SMS 68 is connected to the MMPS 64. MMPS 64 is also connected to multiple-master backup server (MMBS) 76 and MMBS 72. The SMSs in the network offer read-only access while the multiple-master servers (MMSs) allow read/write access. Thus, client 80 has read/write access to MMBS 72, and may modify the domain storage 74 while client 82 has read-only access to SMS 62. Similarly, client 84 has read/write access to the MMPS while client 86 has read-only access to SMS 68. Furthermore a MMBS in the network can replicate from another MMBS while the SMSs can only replicate from the PMMDC, as is illustrated by the arrows. However, all of the computers in FIG. 2 are likely to be interconnected by bi-directional linkages although replication is only from the MMPS to a SMS, as is shown in FIG. 2.

An exemplary single-master server (SMS) system is provided by "MICROSOFT WINDOWS NT 4.0." As previously noted, earlier generations of servers, including "MICROSOFT WINDOWS NT 4.0" employed a single-master replication protocol. An embodiment of single-master replication employs a change-log, or journal, to track changes in course of performing incremental replication. Whenever a change occurs an entry is written to the change-log. The entry may typically contain an index that is incremented for each entry, a reference to the location where the modified information is stored, and possibly a description of the change. In a single-master server system, including the "WINDOWS NT 4.0" implementation, changes could be made only on the PS. Windows NT 4.0 BSs also maintained a change-log consisting of the changes replicated from the PDC. The changes were replicated in the order they occurred on the PS. Therefore the change-log on the "WINDOWS NT 4.0" BSs contained changes in the same sequence as the "WINDOWS NT 4.0" PS. If a BS were to be promoted to be the PS then the other BSs in the system could continue to replicate from this BS as the changes in the change-log retained the same order as the previous PS, although some changes may not have made it to the promoted BS. The remaining BSs in the network simply discarded changes corresponding to entries later than the latest change recorded in the change-log of the newly promoted PS.

"WINDOWS 2000," on the other hand, uses a multiple-master servers (MMS). Changes can be made on any "WINDOWS 2000" server and replicated to other "WINDOWS 2000" servers. A consequence is that different servers see changes in different orders. In a hybrid "WINDOWS 2000", "WINDOWS NT 4.0" network, one of the "WINDOWS 2000" server acts as the principle server (PS), i.e., the PDC for the "WINDOWS NT 4.0" servers in the network. However, changing the PDC role from one "WINDOWS 2000" server to another "WINDOWS 2000" server does not allow for incremental synchronization between the new PDC and "WINDOWS NT 4.0" server because the changes to each of the "WINDOWS 2000" servers are not guaranteed to be in the same order in their respective change-logs. Additional steps are taken to ensure that the order of changes on different "WINDOWS 2000" servers is the same for the benefit of the SMS in the network.

Figure 3:
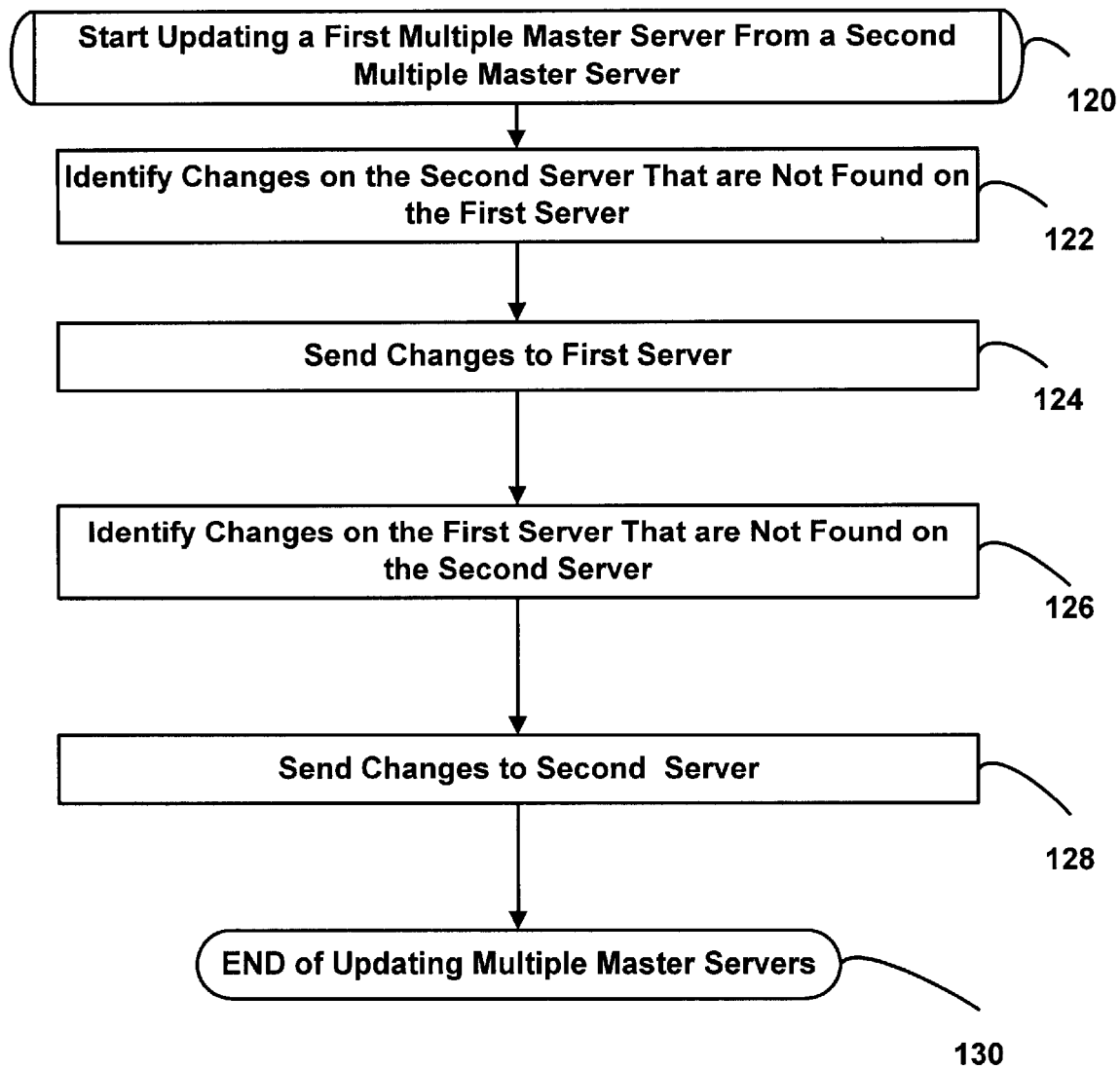
FIG. 3 illustrates a process for updating a multiple master server from another multiple master server.

FIG. 3 illustrates a process for updating a first multiple-master server from a second multiple-master server. Such a procedure may be used for updating a multiple-master backup server from another multiple-master backup server. The procedure is initiated (step 120) with identification of changes on the second server that are not present on the first server, e.g., with a method provided in "WINDOWS 2000" (step 122). The identified changes are sent to the first server (step 124). The procedure is repeated in reverse, although not necessarily in the same operation, by identification of changes on the first server that are not present on the second server (step 126) and the identified changes are sent to the second server (step 128) followed by exiting the procedure (step 130). These changes may be identified since a particular time point on a server. Thus, if the first server had obtained changes until change number 999 of the second server at the last update from the second server, then only changes since change number 999 need be considered at step 122.

Turning to databases implemented in a network, a number of concepts and terms are discussed in order to describe illustrative embodiments of the invention. Databases can, without any loss of generality, be represented as corresponding to a tree structure. The nodes in the tree correspond to the data stored in the database. Thus, in a general sense, a node in such a tree corresponds to an object in the database, where each such object may have several attributes. This picture is in accordance with object oriented programming implementations, although not limited by them.

Figure 4:
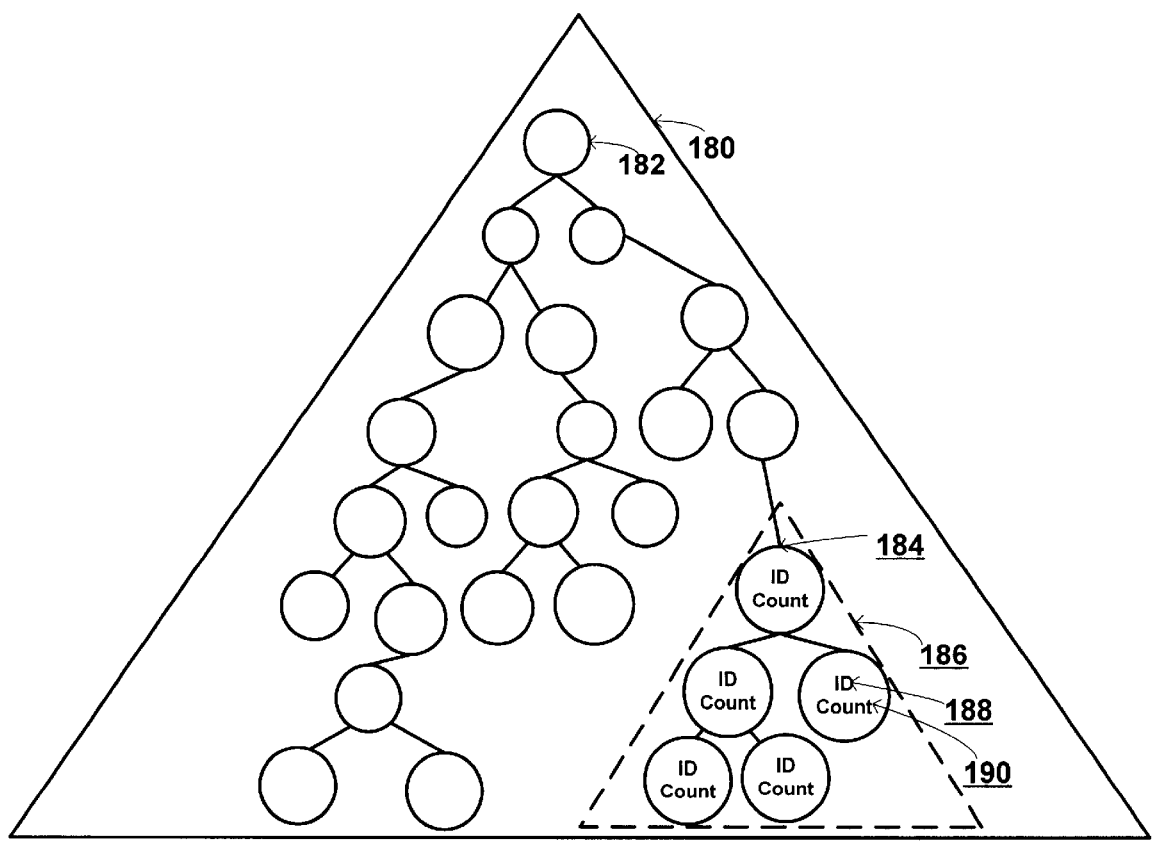
FIG. 4 illustrates a database organized as a tree with a sub-tree representing the object-set.

Furthermore, an object-set, comprising of objects that should be consistent with each other, can be represented as a subtree in the database, thus providing a contiguous representation for the nodes (objects) included in the subtree as illustrated in FIG. 4. The database 180 is shown enclosed by a triangle within which is a tree with a root node 182. This tree has a subtree with a root node 184 defining the object-set 186. Each of the objects in the object-set has two associated attributes, viz., "ID" 188 and "Count" 190. These attributes correspond to a consistency-identifier and a consistency-count respectively in the general case.

A subtree need not be appended to a tree, but may be embedded in the larger tree. The root node of the subtree is connected to the nodes in the subtree in a downstream direction, and each of the subtree nodes is a "child" of the root node. It is also possible to simulate the embedding of a subtree although there might be connections in addition to the root node of the subtree. Such a simulation is possible by suitably defining a boundary for the subtree, possibly using optional attributes in the objects so that the same subtree may be treated differently depending on the context. For the purpose of the discussion here such complexities are noted as not detracting from implementing an embodiment of the invention.

Figure 5:
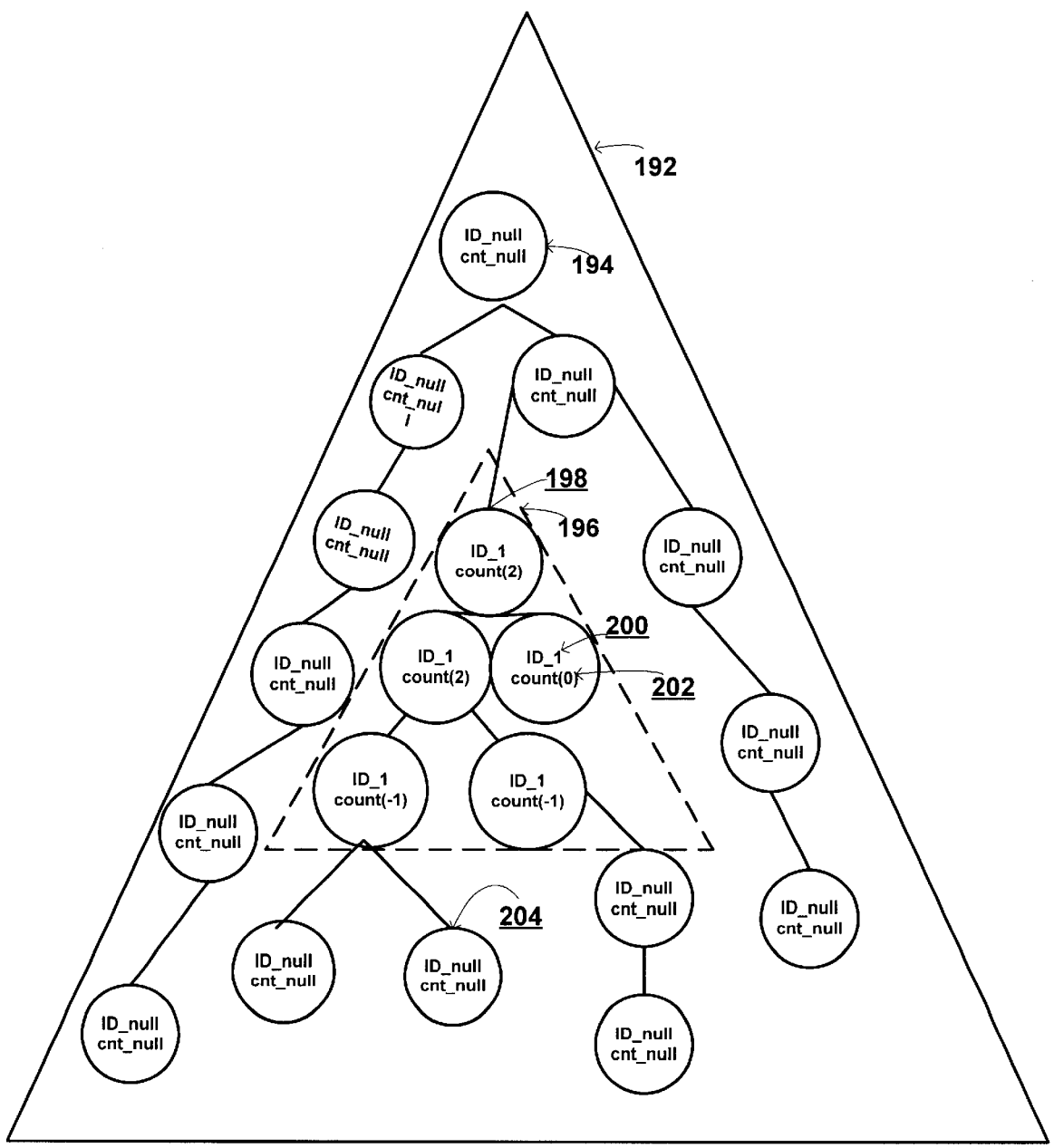
FIG. 5 illustrates an embedded sub-tree in a database.

As an example, an embedded subtree is illustrated in FIG. 5. The database 192 is implemented as a tree with a root node 194 in a manner similar to FIG. 4. An object-set 196 is connected to the database 192 through the root node 198. Each object in the object-set has at least two attributes, a consistency-identifier 200 having a value ID_1 and a consistency-count 202 with a value equal to the number of immediate children of a node, not including the node itself. For the object-set 196, all of the objects have the same consistency-identifier, ID_1, but different values for the consistency-count reflecting the children of the nodes. The leaves of the embedded tree have consistency-counts of "−1" to mark them as leaves and allow a tree traversing algorithm to recognize the boundary of subtree 196 and not proceed, e.g., to node 204. Of course other strategies to mark boundaries of embedded trees are also acceptable.

It should be understood that the objects in a database need not be identical. The branches in the tree structure, where a branch connects adjacent nodes, may represent a part of a possible path for accessing a particular node, in which case the branches would reflect a directory service for accessing data in the database. However, such an interpretation of the branches in a tree representation of a database, while convenient, is not required.

An object, as understood in this context, is manipulable as a unit while an object-set is a collection of objects that are related and contiguous, but changes to any one of the objects in the object-set do not necessarily affect the attributes corresponding to another object in the object-set. This is a useful property since use of an object in an object-set by a client does not prevent access to another object in the object-set. In some implementations, if a user is using an object, another user typically will not be able to use the same replica of that object even if the attributes of interest to the two users are different.

Figure 6:
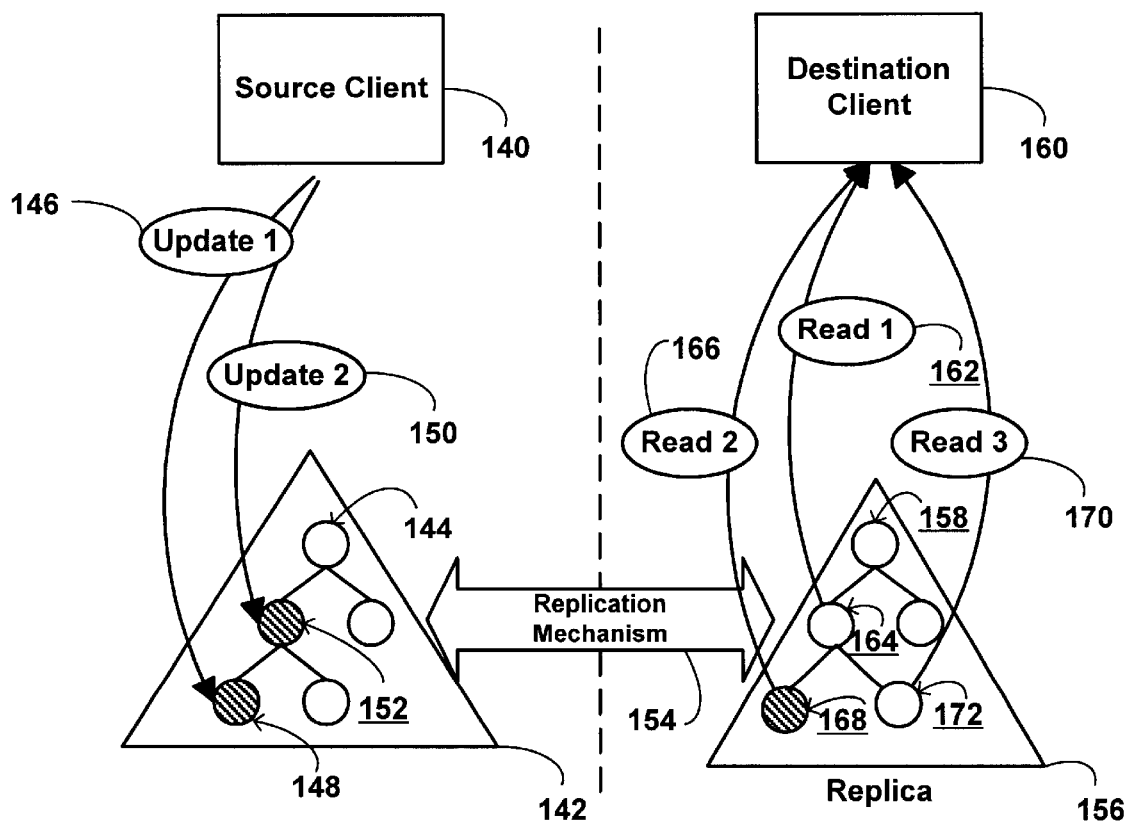
FIG. 6 is a block diagram illustrating a partially updated object-set in a database.

FIG. 6 illustrates an object-set and its partially updated replica as seen by a plurality of clients. It is assumed in this document that a consistent object-set is the result of modifications by a source client 140 prior to any replication because creating an inconsistent object-set is counter productive. Thus, a typical object-set is either consistent or partially updated. Source client 140 accesses a database 142 containing an object-set, organized as a sub-tree with a root 144, and makes update 146 to object 148 followed by another update 150 to object 152. These updates are propagated using replication mechanism 154 to a replica 156 containing a corresponding object-set in a sub-tree with a corresponding root node 158. A destination client 160 carries out a read operation 162 and obtains data in node 164, which corresponds to node 152, prior to updating of node 152. A second read operation 166 allows client 160 to obtain data in node 168, which corresponds to the updated node 148, as is indicated by the hatched lines. A third read operation 170 by client 160 retrieves data corresponding to node 172, which, itself is a replica of node 174, and is not affected by the updating operations by client 140.

Client 160 is retrieving an image of the object-set 142 from the partially updated replica 156 that is potentially internally inconsistent. The time lag between a replication operation that copies node 152 and the node 148 is responsible for the inconsistent data available to client 160, who attempts read operation 162 prior to the updating of node 164, but after the updating of node 168. It should be noted that in a large network similar delays can be significant due to other competing tasks. The locking down of database 142 during updating and of database 156 during the replication would avoid the problem, but deprive other users of access to the database resources that are not part of the object-set represented by the root nodes 144 or 158.

In general, a distributed database allows for independent updating and local control. It is desirable to allow clients the maximum possible access to the database servers. In other words, the need for placing locks should be reduced to the extent possible, as is facilitated in embodiments, in accordance with the invention, described here.

It should also be noted that while objects in an object-set are contiguous, this does not necessarily imply physical proximity, but rather logical relationships. Similarly, the attributes, consistency-count and consistency-identifier, may not necessarily be stored in the root node of an object-set. For instance, instead of modifying the root node attributes to indicate an invalid object-set, an embodiment may include a flag which is settable, where the process for accessing the object-set checks the flag prior to actually conducting a read operation. Maintaining the logical relationship between such flags and the object-set results in embodiments in accordance with the invention. Such variations, known to those of ordinary skill in the art, simulate the consequences of practicing the invention and are intended to be included within the scope of the invention.

In an embodiment of the invention, changes to a database are tracked by advancing an index corresponding to each change. A first server informs a second server of the presence of changes. The second server then requests the first server to replicate corresponding changes since the last cycle of replication, represented by an index number supplied by the second server. Some systems allow identification of changes that are present on the first server but not on the second server, thus, reducing the information actually transmitted to this subset of the changes.

Figure 7:
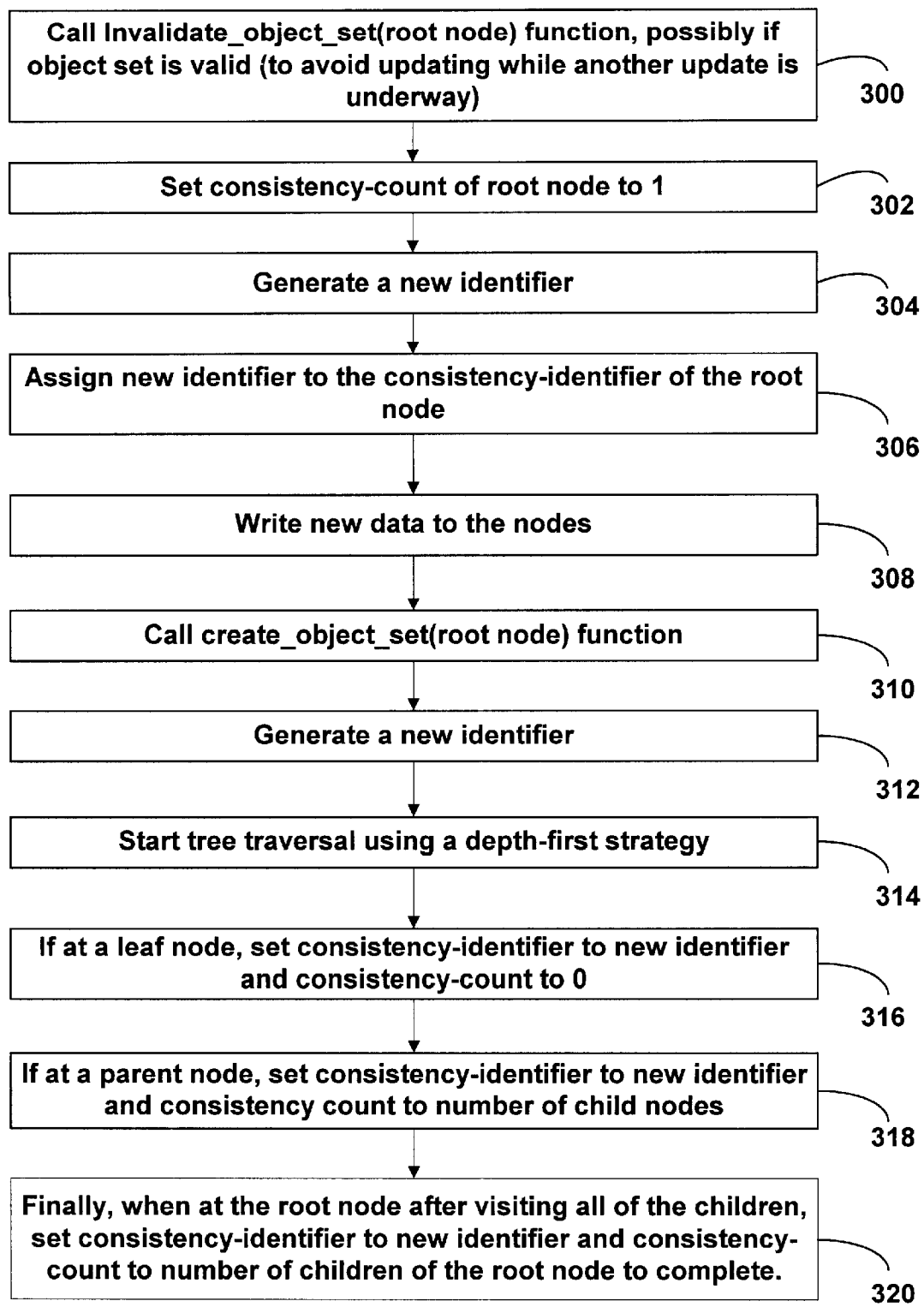
FIG. 7 illustrates a process for creating an object-set in a database in one of the embodiments in accordance with the invention.

As replication proceeds, the first and second servers are not locked, and instead changes to defined object-sets proceed as outlined in FIG. 7 in order to flag partial-updates. The first operation in updating an object-set is "invalidating" the object-set (step 300). This operation ensures that subsequent access to the object-set replica would reveal that a partial-update exists. In an embodiment of the invention, the invalidate_object_set function uses the "distinguished name," of the root node of the object-set, i.e., a name used to locate the node, as an argument. The invalidate_object_set function sets the consistency-count corresponding to the root node to 1 (step 302) and generates a new identifier (step 304), which, in turn, is assigned to the consistency-identifier corresponding to the root node (step 306). These operations are local and fast compared to the exchange of information over the network.

The new data are written to the appropriate nodes in the object-set, and possibly to other nodes as well (step 308). At the termination of the updating operation a call is made to a "create_object_set" function, which also accepts the distinguished name of the root node as an argument in an embodiment of the invention (step 310). This function may generate another new identifier for assignment to the root node's consistency-identifier (step 312). Next, the subtree corresponding to the object-set is traversed, preferably using a depth-first strategy (step 314). Implementation of a tree structure defines a parent-child relationship making tree traversal possible as a basic property.

In a depth-first tree traversal, the procedure starts at the root node and moves to the child that is furthest away from the root node. Only the immediate children of a given node are counted as being children of the node for the purpose of the consistency-count in this embodiment, although variations are possible. In the event a particular node has more than one child, a list is made of immediate child nodes visited during the traversal, and the nodes not yet visited are visited subsequently in order. The order may be dictated by a number, handedness, or a simple walk through a list of the immediate children of a node. The tree traversal procedure can count the children of the nodes in a tree in a recursive fashion. Thus, immediate children of each node may be counted in the same traversal with the children of a child node being counted completely prior to the count of the child nodes being completed.

When the tree traversal walk reaches a leaf node, i.e., with no children, the new identifier is assigned to the consistency-identifier corresponding to the leaf node (step 316). The consistency-count is set to zero or null since there are no children for a leaf node. Then, the traversal routine moves to the parent of the leaf node just visited, a counter corresponding to this parent node is incremented by one for each of its child nodes, and, when the last child has been visited on a node, the consistency-identifier is set to the new identifier, and the consistency-count to the number of children of the node recorded in the counter (step 318). The traversal continues in this fashion until all the children of the root node have been visited. At the root node, the consistency-count for the root node is set to the number of immediate children as it is with all other nodes visited, and the object-set is validated (step 320). The attribute consistency-count can be assigned any single valued function of the children of a node instead of the actual number of children of the node. Such variations are intended to be included in the scope of consistency-count.

Tree traversal, being a local operation, is very fast. It is completed before there is a reasonable chance for changes to be made to the tree just traversed. It is possible that in some embodiments the object-set may be locked for the duration of the tree traversal or the execution of the create_object_set function if such changes should present a real concern. The invention is predicated on the shared intent of updaters to allow detection of (in)consistency in the object set(s) that they create. Thus all updaters follow the algorithms and procedures described by the invention and locking is not necessary.

The use of globally unique identifiers (GUID), or universally unique identifiers (UUID) may advantageously implement the generation of identifiers. The generation of GUID and UUID has become a standard practice. A typical GUID is a 64 or 128 bit number that is guaranteed or almost certain to be unique. Furthermore, GUIDs can be generated at a high rate using standard algorithms. These rates can be as high as ten million numbers per second until approximately 3,400 A.D. These high generation rates combined with the uniqueness make the GUID procedure particularly well suited for generating new identifiers for the object-sets whenever a new write operation is required. However, other methods for generating identifiers can also be employed. Additional details about the GUID algorithm devised by Paul J. Leach and Rich Salz may be found at http://search.ietf.org/internet-drafts/draft-leach-uuids-guids-01.txt.

Figure 8:
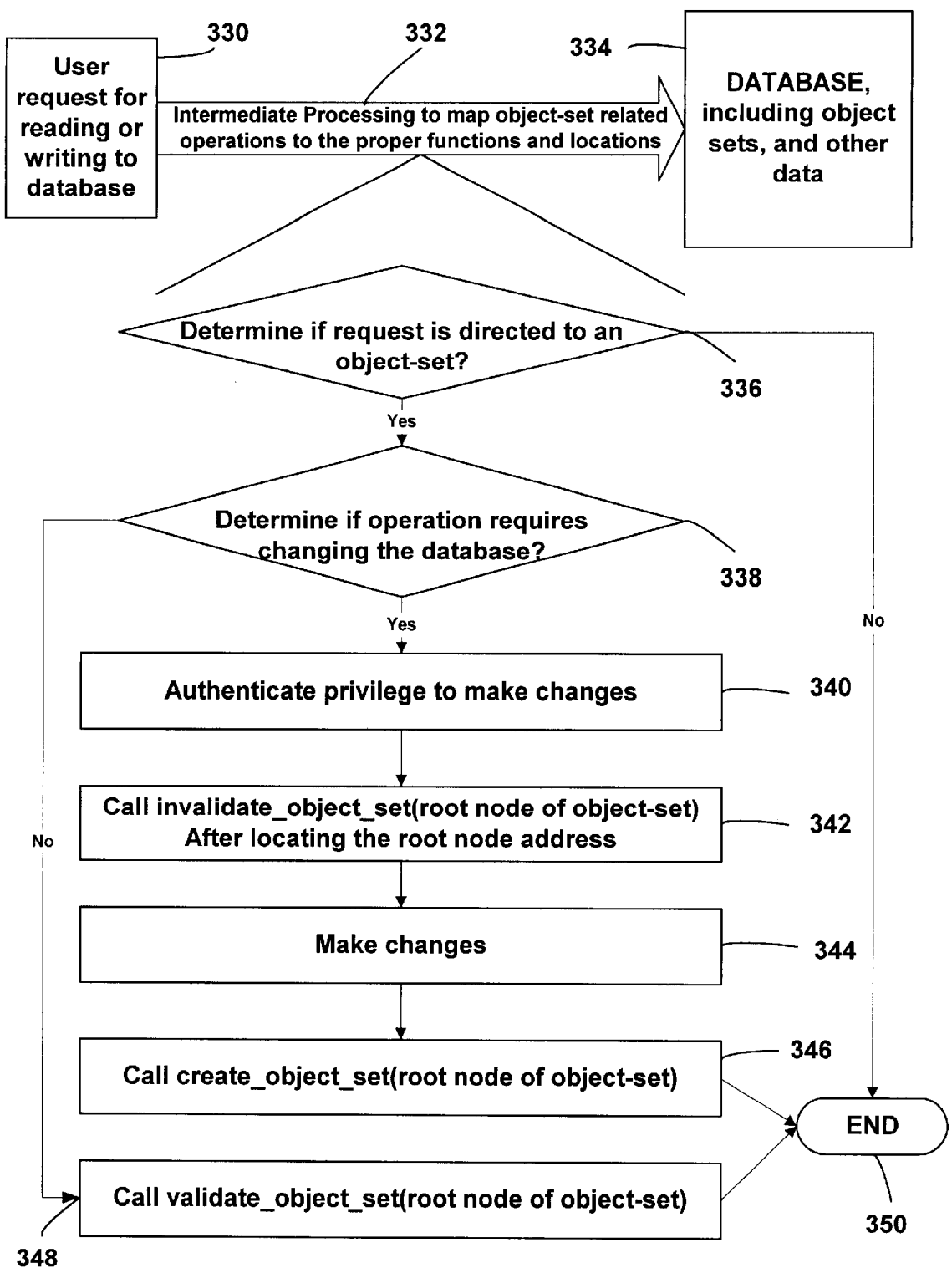
FIG. 8 is a flow diagram illustrating use of a user interface to access a distributed database in one of the embodiments in accordance with the invention.

In an embodiment of the invention, the operation of reading from and writing to an object-set may be handled through a user interface rather than permitting direct access to the memory locations in a database. Referring to FIG. 8, a call 330 to user interface 332 is needed to address the database 334. The user interface 332 includes processing for hiding the actual targets of the requested operations. Exemplary operations may include a determination if an object-set is a target (step 336), followed by a determination if a change to the database 334 is requested or the request is read-only (step 338). If database 334 is to be changed then user privileges may be authenticated (step 338), which may include using encrypted certificates to ascertain user identity, e.g., using secure socket layer (SSL) based negotiations. Following authentication, the relevant object-set is invalidated (step 342), changes are made (step 344) and the object set is validated to indicate end of update activity (step 346). If at step 336 the operations were not directed at an object-set then object-set related routines are not invoked and control passes around (step 350). At step 338 if the operation was a read only operation then the object set is validated (step 348) and control passed on (step 350)

The user interface 332 invokes the invalidate_object_set and the create_object_set functions if the target of the write operation is in an object-set. The user need not know that these functions are being called. Similarly, a read operation from an object-set in a database calls a validate_object_set function. In an exemplary embodiment of the invention, this function accepts the root node of the object-set as an argument, although other implementations are possible as is known to those of ordinary skill in the art and are not intended to be excluded from the scope of the invention. The validate_object_set function carries out a tree traversal in the object-set and counts the number of children of the root node having the same consistency-identifier as the root node. If the number of such children is equal to the consistency-count then the object-set is consistent, i.e., not in a partial-update state, and the read operation can proceed. On the other hand, if the consistency-count does not match then a partial-update is flagged for the benefit of applications that require consistent object-sets. In some embodiments, a partial-update state may automatically terminate a read request while in other embodiments the applications may have the option of terminating a read request.

This procedure can be extended to provide security by conditioning the call on the create_object_set function and/or the invalidate_object_set function on proper authentication to ensure authorized access. In the event of unauthorized access, the object-set may be left in an invalid state, which may be detected later followed by restoration from a backup copy.

While only two additional optional attributes, viz., the consistency-identifier and the consistency-count have been described, additional attributes may be used to authenticate information by attaching digital signatures to information updates. Thus, a digital signature that is derived from the GUID and the information at a particular node may make the information tamper proof. A digital signature typically employs one way hash functions to generate a message of fixed length such that it is exceedingly difficult to manipulate the original so that the hashed message remains invariant.

Typically such signatures and associated information are encrypted. Some embodiments of the invention may use the assymmetric key encryption protocols which allow the use of a public key to decrypt a message, which may be the digital signature and the associated message, but encryption is possible only with the securely held private key. The encrypted message and the associated data can be decrypted by all but no encryption is possible. Since these well known procedures may be combined with the operations on the object-set, it is possible to define a secure object-set that is tamper proof while not requiring that the entire database be encrypted. For secure object-sets step 308 of FIG. 7 or step s344 of FIG. 8 may additionally invoke encryption of the information being written to the object-set nodes. The create_object_set function then can provide a message for creating a digital certificate for a node in the object-set when a new identifier is assigned to a node while traversing the tree at steps 316 and 318 of FIG. 7, and step 346 of FIG. 8.

In yet other embodiments in accordance with the invention, object-sets may be defined with one object-set contained within another. Multiple consistency-identifiers may be associated with a node to identify the different object-sets. Such variations have utility in avoiding traversal of large trees when consistency is of interest only in a small part of a larger object-set.

The various possible embodiments of the invention illustrate the implementations for detecting partial updates, including combining partial update detection with secure databases. In a secure environment, the invention allows flagging of unauthorized access, without necessarily warning the intruder of a failed authentication attempt. Thus, the mere failure to call the create_object_set_function flags the object set as having been tampered, and, thus, being in need of attention.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for creating an object-set in a database to aid in detecting object inconsistency in the object-set, wherein the object-set includes a plurality of objects, each object having a plurality of attributes, and the plurality of objects in the object-set corresponding to nodes in a tree, the tree having a root node, the method comprising:

associating each node in the tree with a consistency-identifier that identifies the nodes in the tree, and a consistency-count that represents information about a number of children nodes of the node;

setting an arbitrary number as the consistency-count for at least one of the nodes;

generating a new identifier; and traversing the tree to visit every node in the tree;

where furthermore, at a particular node in the tree, while traversing the tree:

determining the number of children nodes of the particular node in the tree;

assigning the new identifier to the consistency-identifier associated with the particular node in the tree; and assigning a number associated with the number of children nodes of the particular node to the consistency-count associated with the particular node.

2. The method of claim 1 further including determining the number of children of the particular node in the tree by counting the children of the particular while traversing the tree.

3. The method of claim 1 wherein a depth-first strategy is used in traversing the tree.

4. A method for creating an object-set in a database to facilitate detection of a partial-update of the object-set wherein the object-set includes a plurality of objects, each object having a plurality of attributes, and the plurality of objects in the object-set corresponding to nodes in a tree, the tree having a root node, the method comprising: associating a consistency-identifier with each node in the tree; associating a consistency-count with each node in the tree; setting an arbitrary number as the consistency-count for at least one of the nodes; generating a new identifier; determining a number of children of a particular node in the tree by traversing the tree; and assigning the new identifier to the consistency-identifier of a particular node in the tree, and assigning a number associated with the number of children of the particular node to the consistency-count associated with the particular node.

5. The method of claim 4 wherein the tree traversal follows a depth-first strategy.

6. The method of claim 4 further including the step of assigning the new identifier to a consistency-identifier corresponding to a node in the tree, the node being encountered while conducting a tree traversal of the tree.

7. The method of claim 6 wherein the tree traversal follows a depth-first strategy.

8. A computer-readable medium having stored thereon a database comprising a plurality of objects, each of the plurality of objects having a plurality of attributes, the database comprising an object set, and the object set comprising:

a set of objects selected from the plurality of objects and being organized in a tree structure with an object corresponding to a node of the tree structure, and each of the objects in the object-set having at least two attributes, a first of the two attributes being a consistency-count, the consistency-count not being equal to the number of the children of the node if the object-set is not consistent, in the tree structure corresponding to the object; and a second of the two attributes being a consistency-identifier, the consistency-identifier being equal to the consistency-identifier of every other object in the object-set if the object-set is consistent.

9. The object-set of claim 8 further comprising an object having a digital signature for authenticating a plurality of attributes of the object in the object-set.

10. The object-set of claim 8 wherein the consistency-count of an object in the object-set is equal to the number of children of a node corresponding to the object if and only if the object-set is consistent.

11. The object-set of claim 8 wherein the consistency-identifier of an object in the object-set is equal to the consistency-identifier of an object in the object-set corresponding to a root node of the tree structure if and only if the object-set is consistent.

12. A method of modifying an object-set in a database, the object-set comprising a plurality of objects, each of the objects of the plurality of objects corresponding to a distinct node of a tree, where, furthermore, each object in the plurality of objects having a consistency-identifier and a consistency-count, the method comprising:

invalidating the object-set by assigning a new identifier to a consistency-identifier of a root node of the tree and setting a consistency-count of the root node of the tree to an arbitrary number, the arbitrary number not being equal to the number of children of a node corresponding to the object;

making the modification to the objects-set;

assigning the new identifier to the consistency-identifiers of the remaining objects in the object-set; and setting the consistency-count of each object in the object-set, including the root node, to a value associated with a number of children of a node corresponding to the object.

13. The method of claim 12 wherein assigning the new identifier to the consistency-identifiers of the objects in the object-set includes traversing the tree.

14. The method of claim 13 wherein the tree traversal follows a depth-first strategy.

15. The method of claim 12 wherein the number of children of the node in the tree is determined by traversing the tree using a depth-first strategy.

16. A computer readable medium, having computer-executable instructions for performing, in a database, the database including an object-set, the object-set comprising a plurality of objects, each of the plurality of objects corresponding to a distinct node in a tree, the computer-executable instructions comprising:

creating an object-set, validating the object-set, and invalidating the object-set by setting a consistency-count corresponding the root node of the tree to an arbitrary number.

17. The computer-readable medium of claim 16 wherein creating the object-set includes assigning an identifier to a consistency-identifier corresponding to a node in the tree while traversing the tree; counting the number of children for the node while traversing the tree; and, assigning a number associated with the number of children for the node in the tree to a consistency-count corresponding to the node.

18. The computer readable medium of claim 16 wherein creating an object-set is preceded by setting a consistency-flag, which is checked by a client prior to accessing the object-set, followed by making changes to the object-set, followed by resetting the consistency-flag.

19. The computer-readable medium of claim 16 wherein invalidating the object-set includes assigning a new identifier to a consistency-identifier corresponding to a root node of the tree; and setting a consistency-count corresponding the root node of the tree to one.

20. The computer readable medium of claim 16 wherein invalidating the object-set includes setting a consistency-flag, which is checked by a client prior to accessing the object-set.

21. The computer-readable medium of claim 16 wherein validating the object-set includes counting the number of children of a root node of the tree, each of said children with a consistency-identifier equal to a consistency-identifier of the root node of the tree, while traversing the tree; and declaring the objects set to be valid if the number of children of the root node of the tree is the same as a consistency-count of the root node of the tree.

22. The computer readable medium of claim 16 wherein validating an object-set includes checking a consistency-flag, where the object-set is invalid if the consistency-flag is set.

23. The computer-readable medium of claim 16 having, furthermore, computer-executable instructions for authenticating a user accessing the object-set.

24. The computer-readable medium of claim 16 having, furthermore, computer-executable instructions for generating a digital certificate corresponding to a plurality of attributes associated with an object in the object-set.

* * * * *